United States Patent

Töyrylä et al.

[11] Patent Number: 5,970,417
[45] Date of Patent: Oct. 19, 1999

[54] METHOD FOR MAINTAINING A GROUP CALL

[75] Inventors: Hannu Töyrylä, Vantaa; Rauno Suikkola, Espoo, both of Finland

[73] Assignee: Nokia Telecommunications Oy, Finland

[21] Appl. No.: 08/959,113

[22] Filed: Oct. 23, 1997

Related U.S. Application Data

[63] Continuation of application No. 08/454,389, Jun. 16, 1995, abandoned.

[30] Foreign Application Priority Data

Dec. 17, 1992 [FI] Finland ..................................... 925742

[51] Int. Cl.$^6$ ....................................................... H04Q 7/28
[52] U.S. Cl. ......................... 455/519; 455/520; 455/525; 455/62
[58] Field of Search .................................. 455/518, 519, 455/520, 525, 62, 436, 437, 490

[56] References Cited

U.S. PATENT DOCUMENTS

| | | | |
|---|---|---|---|
| 4,682,367 | 7/1987 | Childress et al. | 455/32.1 |
| 4,905,301 | 2/1990 | Krolopp et al. | 455/34.1 |
| 5,093,926 | 3/1992 | Sasuta | 455/56.1 |
| 5,101,500 | 3/1992 | Marui | 455/56.1 |
| 5,212,822 | 5/1993 | Fukumine et al. | 455/56.1 |
| 5,276,905 | 1/1994 | Hurst et al. | 455/54.2 |
| 5,353,332 | 10/1994 | Raith et al. | 455/56.1 |
| 5,448,752 | 9/1995 | Mabey | 455/56.1 |
| 5,465,391 | 11/1995 | Toyryla | 455/54.1 |

FOREIGN PATENT DOCUMENTS

| | | |
|---|---|---|
| 0571029 | 11/1993 | European Pat. Off. . |
| 3130408 | 2/1983 | Germany . |
| 9305622 | 3/1993 | WIPO . |

*Primary Examiner*—Reinhard J. Eisenzopf
*Assistant Examiner*—Lester G. Kincaid
*Attorney, Agent, or Firm*—Cushman Darby & Cushman IP Group of Pillsbury Madison & Sutro

[57] ABSTRACT

A method for maintaining a group call in a mobile radio system, and a mobile station in a mobile radio system, wherein the geographical area covered by the system is divided into radio cells. Each radio cell includes a base station. A group call is established between the mobile stations belonging to a group call group and residing within the areas of the radio cells forming a limited group call area. In order that the mobile station, upon changing radio cells, is able to select the base station within the area of which the group call is in progress, the respective base stations send one or a plurality of group call maintenance messages to the mobile stations involved in the group call. The group call maintenance message contains information concerning the base stations located within the areas of the radio cells forming the group call area, and the group call group identity.

8 Claims, 8 Drawing Sheets

| CUR-GR | BS# | CC# | TC# |
|---|---|---|---|
| 123 | 1 | 18 | 22 |
| | 2 | 16 | 27 |
| | 3 | 09 | 32 |
| | - | - | - |
| | - | - | - |
| | - | - | - |

| SUBS ID | GROUP ID | CC # |
|---|---|---|
| 201 | 123 | 18 |
| | 321 | 16 |
| | - | 06 |
| | - | 19 |
| | - | 88 |
| | | 65 |
| | | - |

FIG. 7

| BS # | CC # | TC # | FLAG | TC # | FLAG | TC # | FLAG | TC # | FLAG |
|---|---|---|---|---|---|---|---|---|---|
| 1 | 18 | 22 | BUSY | 24 | BUSY | 29 | IDLE | | |
| 2 | 16 | ... | | | | | | | |
| 3 | 06 | | | | | | | | |
| 4 | 19 | | | | | | | | |
| | | | | | | | | | |
| | | | | | | | | | |

FIG. 9

| GROUP ID | BS # | TC # | BS # | TC # | BS # | TC # |
|---|---|---|---|---|---|---|
| 123 | 1 | 22 | 2 | 27 | 3 | 32 |
| 651 | 4 | 36 | 4 | 62 | | |
| 782 | 1 | 24 | | | | |
| | | | | | | |
| | | | | | | |
| | | | | | | |

METHOD FOR MAINTAINING A GROUP CALL

This is a continuation of application Ser. No. 08/454,389, filed on Jun. 16, 1995, which was abandoned upon the filing hereof.

BACKGROUND OF THE INVENTION

The invention relates to a method for maintaining a group call in a mobile radio system, wherein the geographical area covered by the system is divided into radio cells in such a way that adjacent cells overlap, each radio cell comprising a base station provided with an identity, each base station being in radio communication with mobile radio stations located in the radio cell, a group call marked with an identity being established between the mobile stations belonging to a group call group and residing within the areas of the radio cells forming a limited group call area.

The invention is applicable, for instance, in trunking networks, that is, in networks which are private mobile radio networks sharing radio channels to offer several user groups similar functions and services as a private mobile radio network used by a single organization.

The invention is suitable for use in mobile radio systems having either a digital or an analogue radio path. Analogue mobile radio systems are described e.g., in MPT 1327, *A Signalling Standard for Trunked Private Land Mobile Radio Systems*, January 1988, revised and reprinted November 1991, and MPT 1343, *Performance Specification*, January 1988, revised and reprinted September 1991, both issued by the Radiocommunications Agency of the British Department of Trade and Industry.

An essential feature of the above-mentioned mobile radio systems, among others, is that they allow and are designed for the implementation of a group call between a plurality of subscribers.

The group call is a conference call during which all participating subscribers are able to both speak and listen to each other in turns. In group calls, the entire group is called by a single call number. An individual radio unit (such as a mobile station) or a subscriber station may belong to several groups programmed in the radio unit. The system contains a database storing information about base stations associated with the number of each group. The group call may cover one, several, or all of the base stations within the area of a mobile exchange, or several mobile exchanges. To establish a group call, each base station belonging to the group allocates a traffic channel and transmits a group call paging message containing the group number and information indicating the allocated traffic channel. If a mobile radio identifies the group number contained in the group call paging message, it switches to the traffic channel indicated by the paging message. In principle, the mobile radio is thus always able to enter the group call if it is located within the predetermined operation area of the group.

Figure 1:
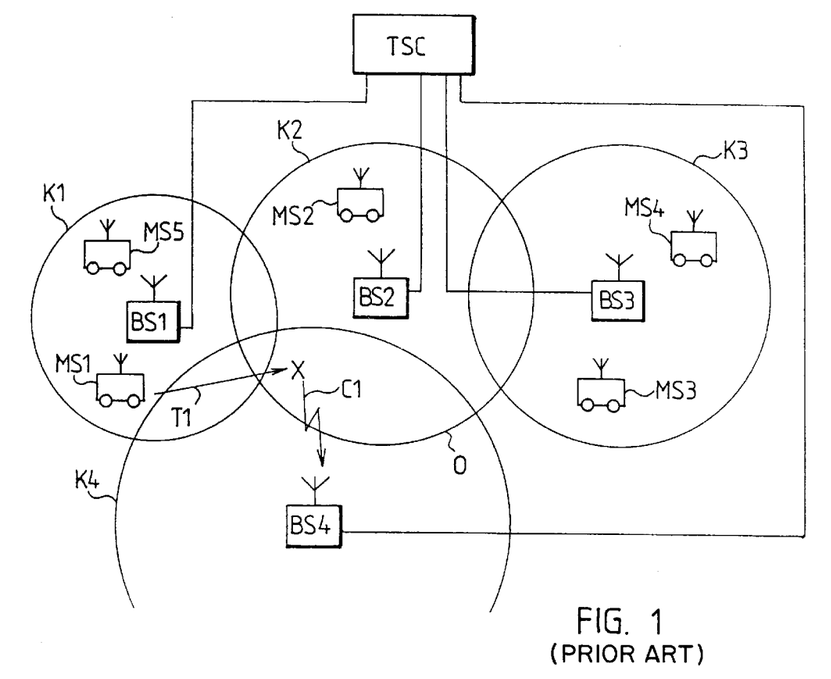
FIG. 1 is a diagram illustrating a prior art mobile radio network and a problem associated with it.

In a cellular mobile radio system, the coverage areas (radio cells) of neighbouring base stations often overlap significantly. Mobile radios located within an overlapping area of two adjacent coverage areas are thus able to use either one of the base stations. A situation problematic for the group call is shown in FIG. 1. In the figure, a mobile station MS1 initially located within a coverage area K1 of a base station BS1 belonging to a group call area K1, K2, K3 and involved in the group call moves to a point X within the coverage areas K2, K4 of two neighbouring base stations BS2, BS4, respectively. This is indicated by the arrow T1. The mobile station thus moves, first, to where the coverage area K4 of the base station BS4 overlaps with the coverage area K1 of the base station BS1, then to where the coverage areas K4, K1 and K2 of the base station BS2 all overlap, then to where the coverage area K2 of the base station BS2 belonging to the group call area K1, K2, K3 overlaps with K4, the coverage area of the base station BS4, which does not belong to the group call area K1, K2, K3. In other words, the mobile station MS1 moves to an overlapping area O of the coverage areas K2, K4 of the base stations BS2, BS4, respectively. If the mobile station MI1 now selects the base station BS4 not belonging to the group call area K1, K2, K3, e.g., due to the higher field strength of the transmission of the base station BS4, the group call of the mobile station MS1 is interrupted, and the mobile station MS1 is excluded from the group call even though it actually is located within the group call area K1, K2, K3, as it unfortunately registered to communicate with the "wrong" base station BS4. In FIG. 1, the communication is shown by tie arrow C1.

One way to solve this problem is to use the same radio channels within the same group call area K1, K2, K3 at all base stations BS1, BS2, BS3 in the radio communication between mobile stations M1, M2, M3, M4, M5 involved in the same call and the base stations B1, B2, B3. Such a system is called a quasisfnc or simulcast system. If the mobile station MS1 moves in this kind of system from the coverage area K1 of the base station BS1 to the coverage area K2 of the adjacent base station BS2, e.g., to point X, it is all the time able to communicate with the base stations on the same radio channel. No interruptions occur in the radio connection, and there is no risk that the mobile station would start to communicate with the base station BS4 located outside the coverage area K1, K2, K3, and, as a result, be excluded from the group call.

A drawback of the above-described prior art method and system is that when the mobile station MS1 is located between the base stations BS1 and BS2, it receives a signal from both base stations BS1, BS2, and these signals interfere with each other. To avoid such interference, the transmitters of both of the base stations BS1, BS2 have to be tuned to an accuracy of a few tens of hertz, whereas a conventional tuning accuracy in analogue cellular radio systems is ±1 kHz, which means that no high accuracy is required in conventional practice. Of course, tuning to a very high accuracy is difficult to realize.

Another drawback of the prior art solution is that it is poorly suited for modern cellular radio systems which are typically based on the assignment of different channels to adjacent base stations whereas, and the same channels are reassigned at spacings of a few base stations. If a simulcast system is used in such an environment, channel management is difficult to perform in the same way as in a conventional cellular radio system. This is because the simulcast system assigns the same channel to all base stations within a group call area for a specific group call, thus deviating from the conventional principle applied in cellular systems, where the channels vary from one base station to another. The channel management in a simulcast radio system is thus expensive and difficult to implement as well as unreliable in operation.

Furthermore, implementation of the prior art simulcast radio system requires that the interference occurring in transmissions received at the same mobile station over the same channel from different base stations should be eliminated. This is done by compensating for transmission delays of calls forwarded from the system controller of the cellular radio system to the different base stations, i.e., delays occurring over the same voice channel, and by synchronizing such delays so that the same voice channel is transmitted simultaneously from all base stations transmitting a specific group call. Such compensation and synchronization of transmission delays are difficult and require high precision as well as high equipment investments.

SUMMARY OF THE INVENTION

The object of the present invention is to enable the movement of a mobile station involved in a group call between the base stations of the group call area in such a way that when the mobile station moves during the group call to a coverage area shared by a first base station belonging to the group call area and a second base station not belonging to the group call area, there is no risk of the mobile station registering to the wrong base station, i.e., the one not belonging to the group call area, and being thus excluded from the group call.

This new group call method in a cellular radio system is achieved by a method according to the invention which is characterized in that the base stations send one or a plurality of group call maintenance messages to the mobile stations involved in the group call, the group call maintenance message containing information concerning the base stations located within the areas of the radio cells forming the group call area, and the group call group identity; the mobile station receives the information and the group call group identity; upon changing the radio cell, the mobile station selects, on the basis of the information received, a base station within the area of which the group call is in progress.

Another aspect of the invention is a system controller in a cellular radio system, comprising a memory means for storing information concerning mobile stations; an interface means for providing telecommunication connections; a switching matrix for switching speech paths; and a controller means, the controller means comprising means for sending one or a plurality of group call maintenance messages on a traffic channel via each base station located within the group call area during the group call.

Still another aspect of the invention is a mobile station in a mobile radio system, the mobile station comprising a memory means; a transceiver; a controller means for controlling the operation of the mobile station; the mobile station comprising means for receiving one or a plurality of group call maintenance messages containing information concerning base stations located within the area of radio cells forming a group call area, and a group call group identity; the memory means being arranged to store at least part of the information contained in the received group call maintenance messages; and the controller means being arranged to select, on the basis of the information contained in the received group call maintenance messages, a base station within the area of which the group call is in progress.

The invention rests on the idea that the identities of the base stations of radio cells forming the group call area and possibly the identities of the control channels of these base stations are transmitted from the base stations of the cellular radio system to mobile stations involved in a specific group call. It is also possible to transmit the identities of traffic channels used for the specific group call at the base stations located within the group call area. The system controller of the cellular radio system comprises means for transmitting the abovementioned information to the base stations to be further forwarded to mobile stations. The information transmitted by the base stations is stored in a memory at each mobile station, where it is available when the mobile station changes base station.

An advantage of the group call method in a cellular radio system, the system controller and the mobile station of a cellular radio system according to the invention is that they solve the problem described above with reference to FIG. 1, where a mobile station involved in a group call moves from the coverage area (radio cell) K1 of a base station BS1 belonging to the group call area to the coverage K2, K4 of two other base stations BS2, BS4.

In addition, the group call method in a cellular radio system, the system controller and the mobile station of the mobile radio system according to the invention eliminate interference occurring in a mobile radio system where the same traffic channel is used for the traffic of the same group call within the coverage areas of adjacent base stations. Thus, the invention eliminates the need to tune channels, as no such interference occurs. Moreover, the use of the method and system according to the invention allows the utilization of the cellularity typical of modern mobile radio systems, as the same frequency can be used for the traffic of several group calls if the frequency is used according to the cellular principle, i.e., only within the area of radio cells with sufficient mutual spacing. Finally, the invention does not require the compensation of transmission delays of transmission lines, which are difficult to compensate and requires plenty of resources.

BRIEF DESCRIPTION OF THE DRAWINGS

In the following, the invention will be described in greater detail with reference to the attached drawings, in which.

DETAILED DESCRIPTION

FIG. 1 has been described more closely above in the description of the background of the invention, where the problem solved by the present invention has been set forth.

Figure 2:
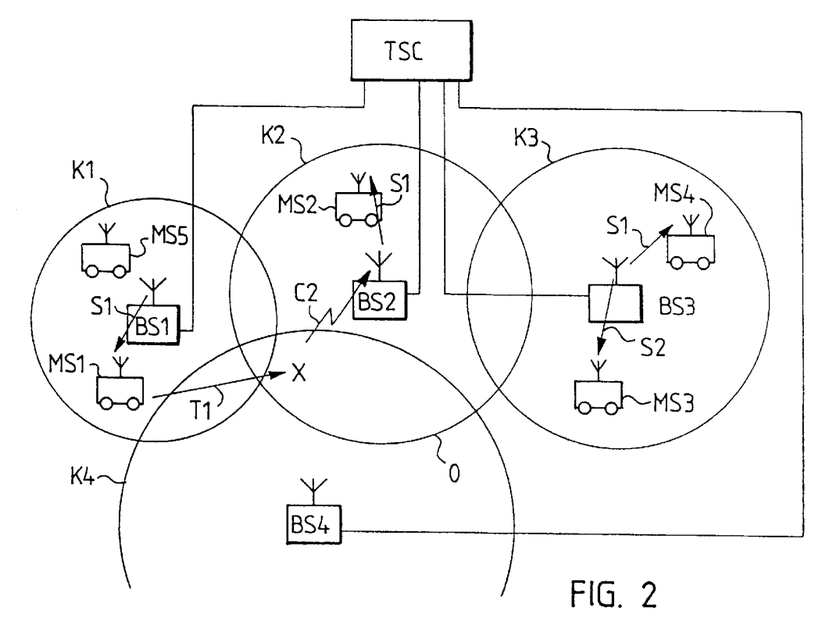
FIG. 2 is a diagram illustrating a mobile radio network according to the invention.

The invention will be described more closely below by means of an embodiment with reference to the attached FIG. 2, which illustrates a radio system in which the invention can be applied. FIG. 2 shows a mobile radio system, where the geographical area covered by the system is divided into smaller radio areas or radio cells K1, K2, and K3, K4 in such a way that adjacent cells preferably overlap. Each cell is assigned certain frequency channels for speech connections, so that at least cells which are close to each other have different frequencies. Each cell K1, K2, K3 and K4 comprises at least one single- or multi-channel transceiver equipment BS1, BS2, BS3, BS4, which will be called a base station in this text. All base stations BS1, BS2, BS3, BS4 are connected to a trunking system controller (TSC) controlling the operation of the base stations. The function of the TSC is to control the operation of the system and especially to control the base stations and to switch calls between a plurality of base stations. The subscribers of the mobile radio system consist of mobile stations MS1, MS2, MS3, MS4 and MS5. The mobile stations MS1, MS2, MS3, MS4 and MS5 are commanded by the system on special signalling or control channels. Each base station BS1, BS2, BS3, BS4 usually has a separate control channel, but other solutions are possible as well. Calls are established on traffic channels over which it is also possible to signal matters associated with the call, such as the release of the call. Mobile stations not involved in a call listen to the control channel of the base station within the area of which they are currently located. The mobile station and/or the system thereby comprises a method for identifying the control channel to which the mobile station should listen, i.e. the base station within the area of which the mobile station is located. One such method is described in MPT 1343, chapter 9, issued by the Radio-communications Agency of the British Department of Trade and Industry.

An essential feature of a mobile radio system comprising a plurality of base stations BS1, BS2, BS3, BS4 is thus that the mobile station MS1, MS2, MS3, MS4, MS5 is able to change from one control channel to another when it moves from the area of one base station to the area of another base station. The socalled trunking system discussed herein differs from so-called mobile telephone systems in that the transfer from one base station to another during an ongoing call has not been implemented but the call is terminated at least for some time when a mobile station, say MS1, moves (this is illustrated by the arrow T1) out of the radio cell K1, i.e., out of the coverage area of the base station BS1. The mobile station MS1, however, has to find the control channel of the new base station, BS2 or BS4.

The mobile stations MS1, MS2, MS3, MS4, MS5 may communicate either in pairs or in a group call. The group call is a function in which mobile stations belonging to a predetermined group, such as MS1, MS2, MS3, MS4 are in radio communication with each other. The group call is established within the area of a single base station or a plurality of base stations. In this specific case, the group call area includes the coverage areas K1, K2, K3 of the base stations BS1, BS2, BS3. The area is generally defined specifically for each group in the system, e.g., in the system controller TSC. However, the area may also be determined on the basis of the location of the mobile stations MS1, MS2, MS3, MS4 belonging to the group during the call establishment. Even an individual subscriber may determine the group call area as desired. In the case of FIG. 2, the mobile stations MS1, MS2, MS3, MS4 belong to the same group, which has established a group call within the area controlled by the base stations BS1, BS2 and BS3. Each one of the base stations has allocated a traffic channel for the group call. There may be other on-going calls on the other traffic channels of the base stations BS1, BS2, BS3. Mobile stations MS5 not involved in any call follow the control channel of the base station BS1 of their own location area.

The mobile station MS1 will now be discussed. Upon moving towards point X, as shown by the arrow T1 in FIG. 2, the mobile station finally moves outside the coverage area of the base station BS1 and is thus excluded from the group call. It is to be noted that the mobile station, however, is still within the operation area of the group call as it is located within the coverage area K2 of the base station BS2.

As is well-known, information about on-going group calls may be transmitted at regular intervals on the control channel in order that the mobile stations that have left the call or have just been switched would be able to enter the call. Accordingly, if the mobile station MS1 selects the base station BS2 as its new base station, it is able to re-enter the call after a short interruption in the connection. The duration of the connection interruption depends on the time required for the mobile station MS1 to select the control channel of the base station BS2, and on the rate of repetition of the transmissions of group call information on the control channel.

However, if the mobile station MS1 now selects the base station BS4, as it is located within the coverage area O common to the base stations BS2 and BS4, it will not be able to re-enter the call but it will register to listen to the control channel of the base station BS4.

In the present invention, signalling messages S1 are broadcast on the traffic channels of the base stations during the group call. The signalling messages inform the mobile stations MS1, MS2, MS3, MS4 belonging to the group about the base stations belonging to the same call. Such signalling messages S1 may be called group call maintenance messages S1. The mobile station utilizes the information contained in the group call maintenance messages S1 in such a way that when it has to select a new control channel when the call has been interrupted, it gives priority to a base station at which the message indicates the group call to be in progress. In this specific case, the mobile station MS1 thus knows that it has to give priority to the base stations BS1, BS2 and BS3, as it has received the group call maintenance message S1. As a consequence, the mobile station MS1 will select the base station BS2 when it is located within the coverage area O shared by the base stations BS2 and BS4.

The group call maintenance messages S1 to be broadcast may contain, in addition to the identities of the base stations of the group call area, the identity of the group call group to which certain mobile stations belong. The group call maintenance messages S1 may further contain the identities of the control or signalling channels of the base stations within the group call area of a specific group call group. In addition, the group call maintenance messages S1 may contain the identities of the traffic channels used as group call traffic channels at the base stations within the group call area of a specific group call group.

In order that the mobile station MS1 would not need to wait for a group call entry command delivered at regular intervals, one aspect of the invention is that the mobile station MS1 may transmit on the control channel to the base station a request to reenter the group call, provided that the call is still in progress, as it is possible that the call has been released in the meantime.

It is known to enter a group call by transmitting a group call establishment request, but a drawback of this procedure is that if the call has already been released, it will be re-established, as a result of which the other mobile stations, in this specific case MS2, MS3, MS4, will be involved in the call although it has already once been terminated.

The invention thus relates to a system comprising the mobile stations MS1, MS2, MS3, MS4, MS5; the base stations BS1, BS2, BS3, BS4; and the system controller TSC. The implementation of the invention mainly concerns the system controller, the mobile station, and signalling messages these interchange on control and traffic channels.

Figure 3:
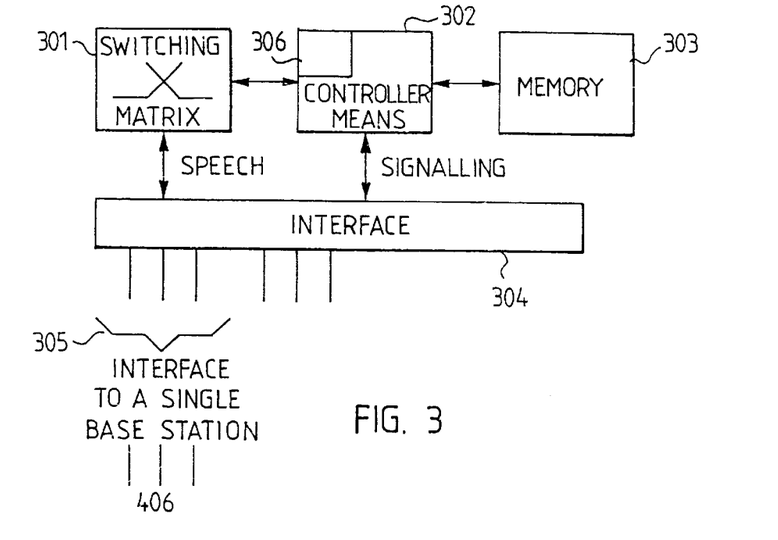
FIG. 3 is a block diagram illustrating a system controller according to the invention, for a mobile radio system.

FIG. 3 illustrates the configuration of the system controller according to the invention. The function of an interface means 304 is to offer interfaces 305 for the base stations BS1, BS2, BS3, BS4 both with respect to speech and signalling. There may also be interfaces e.g., to a telephone network, telephone exchanges and other system controllers. A switching matrix 301 and a controller means 302 are connected to the interface means 304 e.g., by a data bus.

The function of the switching matrix 301 is to switch speech paths between different interfaces specifically for each call. In a call between two subscribers, the speech paths of the two interfaces are interconnected. In a group call, all mobile stations MS1, MS2, MS3, MS4 involved in the call are interconnected in the same way as in a conference call, for instance.

One of the functions of the controller means 302 is to take care of call establishment and release. For this purpose, the controller means is connected to the interface means 304, via which it is able to transmit and receive signalling messages. The controller means 302 is also connected to the switching matrix 301 for controlling it specifically for each call. In the system controller according to the invention, the controller means 302 comprises means 306 for transmitting one or more group call maintenance messages on the traffic channel via each base station located within the area of the group call during the group call. Different alternatives for the contents of the group call maintenance messages are dealt with in the text referring to FIG. 2.

A memory means 303 is further connected to the controller means 302. This memory means 303 may either be integrated with the controller means 302 or with the entire system controller, or it may be a separate memory means. All information necessary for the operation of the system is stored in the memory means 303. Such information includes e.g., information concerning the mobile stations MS1, MS2, MS3, MS4, MS5, such as information about mobile stations authorized to communicate within the system, information about the functions allowed for each mobile station MS1, MS2, MS3, MS4, MS5, information about the location of the mobile stations, e.g., within an accuracy of one base station or location area, and information about ongoing calls.

It is also known that the memory means 303 may store the specification of the group call establishment area, i.e., the group call area, which defines criteria for the selection of the base stations to be involved in the group call on the basis of the identity of the group call group.

Figure 4:
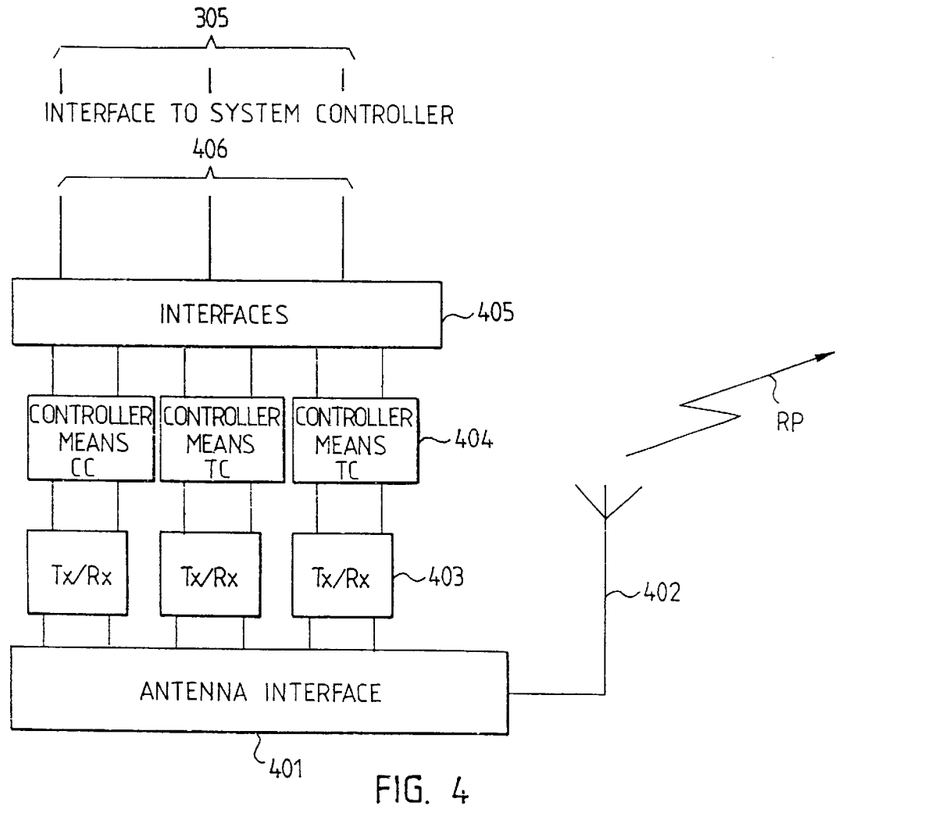
FIG. 4 is a block diagram illustrating a base station in a mobile radio system.

FIG. 4 shows one possible configuration for the base station. The base station comprises an interface 405 to an interface 305, means 401 for connection to an antenna 402, i.e., an antenna interface, and channel-specific means. Via the antenna 402, the base station is connected to a radio path RP. The base station is typically a multi-channel station, and a transceiver unit TX/RX 403 and a channel-specific controller TC 404 are required for each channel.

The main function of the base station is to establish a connection on a radio channel between the mobile stations MS1, MS2, MS3, MS4, MS5 and the system controller TSC. The radio channels are functionally divided into signalling or control channels CC and traffic channels TC. The control channel CC is used for the establishment of calls and for the execution of other system functions. The traffic channel TC are used for the delivery of subscriber calls. The mobile stations are normally tuned to the control channel CC, and they are commanded to the traffic channel TC during a call. It is also possible to transmit signalling on the traffic channel TC during a call. The control channels CC and traffic channels TC are not always separate.

Figure 5:
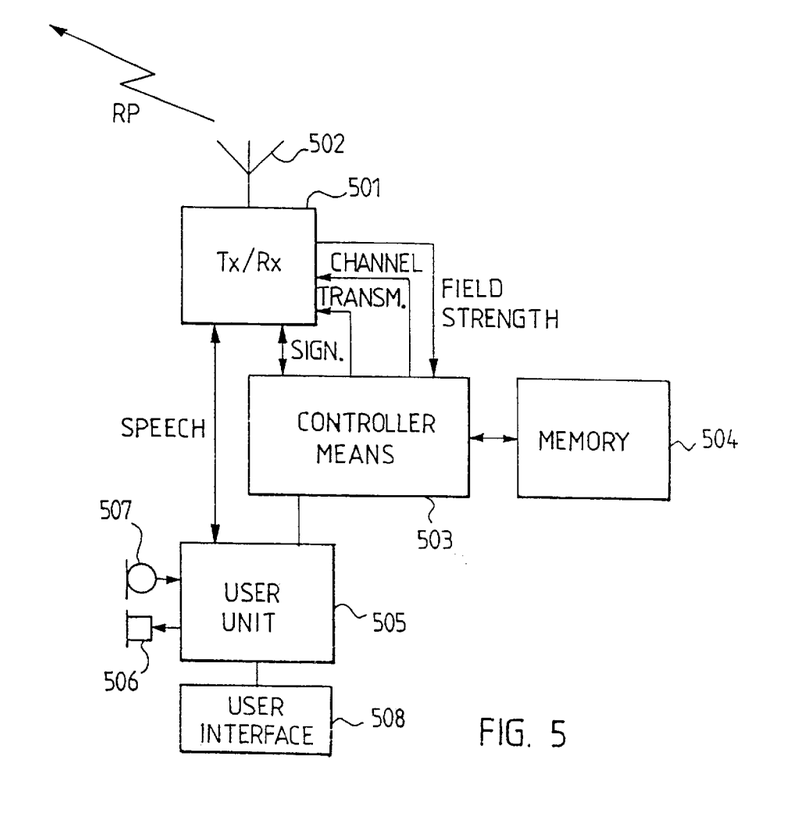
FIG. 5 is a block diagram illustrating a subscriber station or mobile station according to the invention, used in a mobile radio system.

FIG. 5 shows a typical mobile station, i.e., the configuration of a radio telephone used by a subscriber. The function of a transceiver (TX/RX) 501 is to adopt to, i.e., communicate via a radio channel used in each particular case. The transceiver 501 has an associated antenna 502 which is connected to a radio path. Radio frequencies ranging from 60 to 1,000 MHz (VHF and UHF bands) are usually used. Analogue modulation may be used over the radio path RP, in which case phase modulation is usually applied. Other ways of modulation are possible as well. Signalling may be transferred e.g., on a voice-frequency subcarrier (FFSK). The radio path transfer may also be digital.

A user unit 505 comprises electro-acoustic converter means, typically an earpiece 506 and a microphone 507, possibly also function keys needed for the initiation, termination and selection of a call at a user interface 508. As speaking over the radio path RP preferably takes place alternately in the trunking system, the user unit usually also comprises a speaking key (PTT=Push-to-Talk-Button) which has to be held down while speaking. However, this might not be necessary if the system is a duplex system.

The function of a controller means 503 is to control the operation of the mobile station. The controller means 503 is connected to the user unit 505, from which it receives e.g. impulses initiating and terminating a call. The controller means 503 may also give the user acoustic or visual signals concerning the operation of the mobile radio system via the user unit 505 or the user interface 508.

The controller means 503 is connected to the transceiver TX/RX 501. It assigns a channel to the transceiver, that is, the transceiver 501 is tuned to a channel, i.e., a radio frequency, determined by the controller means 503. The transceiver 501 is also switched on under the control of the controller means 503. The controller means 503 receives and transmits signalling messages by means of the transceiver 501. The controller means may also be informed of the field strength of the received signal.

The controller means 503 has an associated memory means 504 storing both permanent and variable information. Permanent information includes the subscriber number of the mobile station, the numbers of groups to which the mobile station belongs, and the radio channels included in the system. Variable information includes the current state of the mobile station, such as a rest state, a call establishment state, a call state, and e.g. information indicating to which channel the station is currently tuned.

In the rest state the mobile station searches for a control channel belonging to the system. After finding the control channel, the mobile station may transmit a signalling message so as to indicate the system within the area of which base station it is currently located. This mechanism is described e.g. in MPT 1327, which defines an RQR message. The mechanisms associated with this message are described more closely in MPT 1343, chapter 10.

When the mobile station moves out of the coverage area of the base station, the controller means 503 of the mobile station is informed of this in such a way as is described in MPT 1343, chapter 9, for instance, and the mobile station searches for the control channel of a new base station in such a way as is described in the chapter mentioned above. The mobile station may also directly decide to change the control channel when it finds out, on the basis of signal strength measurings carried out by it on other channels, that the field strength of another control channel is permanently higher.

Figure 6:
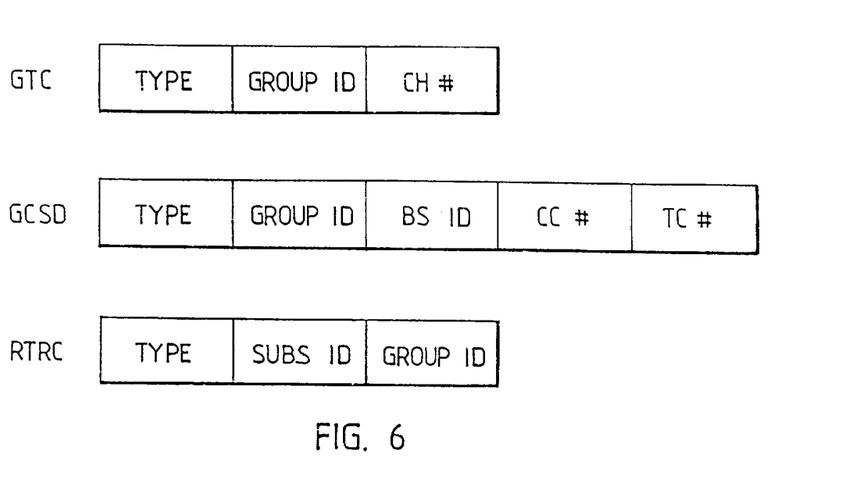
FIG. 6 shows a few examples of subscriber signalling messages used in the mobile radio system according to the invention.

FIG. 6 illustrates a few simplified signalling messages GTC, GCSD, RTRC, on the use of which the invention is based. The signalling messages are simplified in the sense that only information relevant to the present invention is indicated. In practical systems, the signalling messages may also contain other information essential to other system features.

All the messages to be described below include a TYPE field on the basis of which the receiving party, a mobile station or system controller, distinguishes messages of different types from each other. Such a message format is disclosed e.g., in MPT 1327.

The system controller employs the GTC message to command the mobile station to a radio channel assigned to a call. This procedure is known e.g., from MPT 1327. The GTC message contains at least the following information:

GROUP ID The identity of the group call group for which a group call is being set up. Only the mobile stations which belong to the group identified here will obey the message.

CH# Identity of the traffic channel used for the group call of the group identified by the GROUP ID, on the base station on which the message is transmitted.

A mobile radio unit is normally expected, upon receipt of a GTC message containing a GROUP ID of a group to which it belongs, to tune to the identified traffic channel for a group call.

The Group Call Specific Data message GCSD, i.e., the group call maintenance message is relevant to the implementation of the present invention. The system controller (TSC, FIG. 3) employs the message to inform mobile stations involved in a group call on the traffic channel about the base stations switched to the same group call and about the frequencies used at the base stations.

The character # signifies an identity, such as a number. The message contains at least the following information:

GROUP ID Identity of a group call group.

BS ID Base station identity. It tells the 19 mobile station that the same group call is in progress at this particular base station. The number of messages transmitted is equal to the number of base stations switched to the group call.

CC# Identity of a control channel used by a particular base station, such as a number. The mobile station MS stores the identity in a memory, and, when it has to change base station, i.e., search for a new control channel during a group call, it selects preferentially a control channel marked with this identity.

TC# Identity of a traffic channel used at a particular base station for a specific group call, such as a number. It enables the mobile station to transfer directly to the traffic channel of another base station. When the mobile station moves out of the coverage area of the base station, it first searches for a new traffic channel from among channels marked with this identity: If a group call maintenance message, i.e., a GCSD message, having the right group number of the group call group is received on this kind of traffic channel, the mobile station concludes that it has re-entered the call and opens speech paths to the user. This procedure is necessary to ensure that the mobile station will not be connected to the wrong group call, thus maintaining the secrecy of telephone communication.

The Request to Re-enter Call message RTRC is used if the mobile station has changed the base station when the group call is in progress and then wants to re-enter the call. The mobile station transmits the RTRC message on the control channel of the new base station. If the call is still in progress, the system controller responds by sending a GTC message (which will be described below) to command the mobile station to re-enter the call. If the system controller keeps record of subscribers currently connected to the group call, it is able to record that the mobile station is connected to the call at the new base station.

The RTRC message contains a subscriber identity SUBS ID, and a group call group identity GROUP ID, such as a number. Even in cases where the mobile station has switched directly to the traffic channel of the group call on the basis of received traffic channel information TC#, it may indicate the system controller that it has changed base station by sending the RTRC message on this particular traffic channel TC#.

Figure 7:
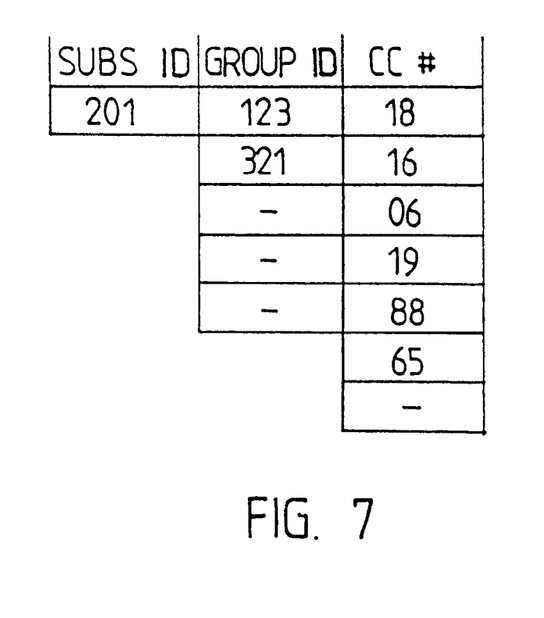
FIG. 7 shows a memory configuration used at the mobile station of a mobile radio system.

FIG. 7 illustrates the configuration of the memory of the controller means of the mobile station (503, FIG. 5) of the mobile station in view of the invention. The table lists permanent information necessary for the operation of the mobile station, that is, information that changes very seldom, if ever. Such information is known from e.g., MPT 1327 and MPT 1343. The information includes:

SUBS ID Number of a mobile station.

GROUP ID Identities of group call groups, such as numbers, to which the mobile station is programmed to be involved. They are programmed either permanently or a procedure is available for changing them.

CC# Group of preferential control channels. When the mobile station has no information about an appropriate control channel, it searches for it by going through preferentially channels listed herein.

Figure 8:
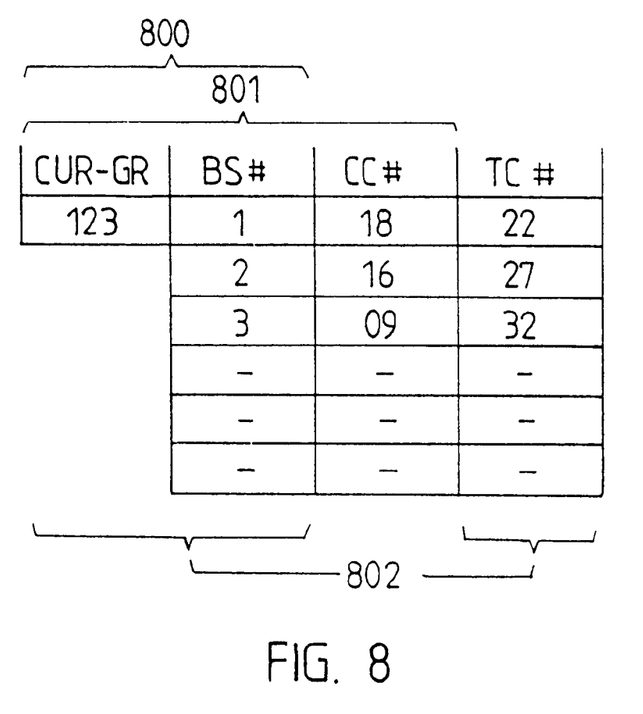
FIG. 8 shows a memory configuration in a memory means, used in a subscriber station or mobile station according to the invention.

FIG. 8 shows information stored in the mobile station and relevant to the invention. This information is call-specific, i.e., the table is built up when a group call begins, and it is completed with information on the basis of group call maintenance messages, that is, GCSD messages. The table includes:

CUR-GR Group number of a group call in progress.

BS# Base station number extracted from a GCSD message during a call.

CC# Number of a control channel extracted from a GCSD message during a call.

TC# Number of a traffic channel extracted from a GCSD message during a call.

As the information is call-specific, the mobile station is able to delete all information contained in the table when the call terminates.

In the invention, the significance of the mobile station lies in that a mobile station involved in a group call extracts information from group call maintenance messages GCSD for the table shown in FIG. 8, which illustrates the memory configuration of the mobile station. When the mobile station moves out of the coverage area of the base station that it uses, it may employ either one of the following methods to reenter the call via the new base station.

The first alternative according to the invention is effected by employing the following method 1.

The mobile station is tuned to each one of the control channels CC# included in the table of FIG. 8. This is illustrated by the reference numeral 801 in FIG. 8. If the mobile station finds an appropriate control channel in this way, it sends the message RTRC on the control channel as a request to re-enter the group call.

If the group call is still in progress, the system controller TSC responds to the RTRC message sent by the mobile station by sending the message GTC, which commands the mobile station to the correct traffic channel to enable it to re-enter the group call. The content and effects of the messages sent are described more closely in connection with the description related to FIG. 6.

If the mobile station does not find an appropriate control channel from among the CC# channels listed in the table of FIG. 8, it concludes that it has moved out of the coverage area of the group call and indicates to the user that the call has been interrupted and starts to search for a control channel from among the CC# channels listed in the table of FIG. 7.

The second alternative according to the invention is effected by the following method 2.

The mobile station goes through the traffic channels TC# listed in the table of FIG. 8. This is illustrated by the reference numeral 802. When the mobile station finds a transmission of sufficient strength on the channel, that is, a signal having a sufficient field strength, it checks if the channel is actually used by the group in question. This may be done either by waiting for the next group call maintenance message, i.e., the GCSD message, sent by the system controller, and comparing the group number contained in it with the identity of the on-going group call in which the mobile station is involved, i.e., with the number CUR-GR. If the identities are equal, the mobile station opens the speech paths and the subscriber is able to continue the call.

If no GCSD messages are encountered on the traffic channel or the group call group identity contained in such a message is not the correct one, the mobile station transfers to the following traffic channel TC# listed in the table of FIG. 8. After all traffic channels have been checked, the mobile station may either initiate a new search according to the above-described method 1, or it may inform the subscriber that the call has been released and start to search for a control channel from among the CC# channels of the table shown in FIG. 7.

Figure 9:
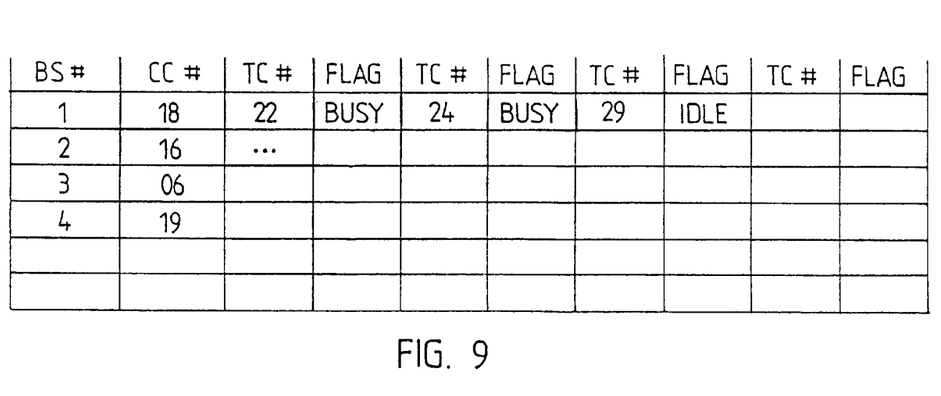
FIG. 9 shows a memory configuration of a memory means, used in the system controller of a mobile radio system.

FIG. 9 shows the memory of the system controller, illustrating stored information relevant to the invention.

The table of FIG. 9 stores channels used by the mobile radio system specifically for each base station. Such a table is necessary for the operation of the trunking system. The table comprises for each base station BS#:

CC# Number of a control channel used currently at the base station.
TC# Traffic channels currently used by each base station are listed.
FLAG A state flag for each traffic channel TC#, indicating whether the channel is idle or busy. In addition to the state flag, there may be a reference to information indicating the subscriber/s that have reserved the channel, and other similar information.

In call establishment, the system controller TSC finds an idle traffic channel on the basis of this table, establishes a call and indicates that the channel is busy by changing the state of the state flag of the particular channel.

Figure 10:
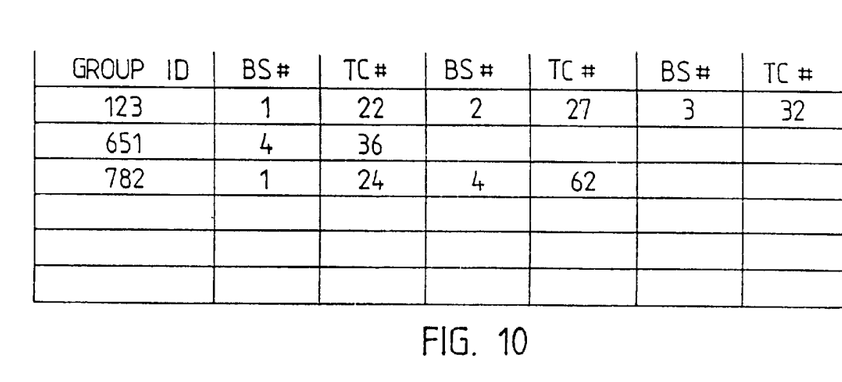
FIG. 10 shows a memory configuration, used in the system controller according to the invention.
Figure 11:
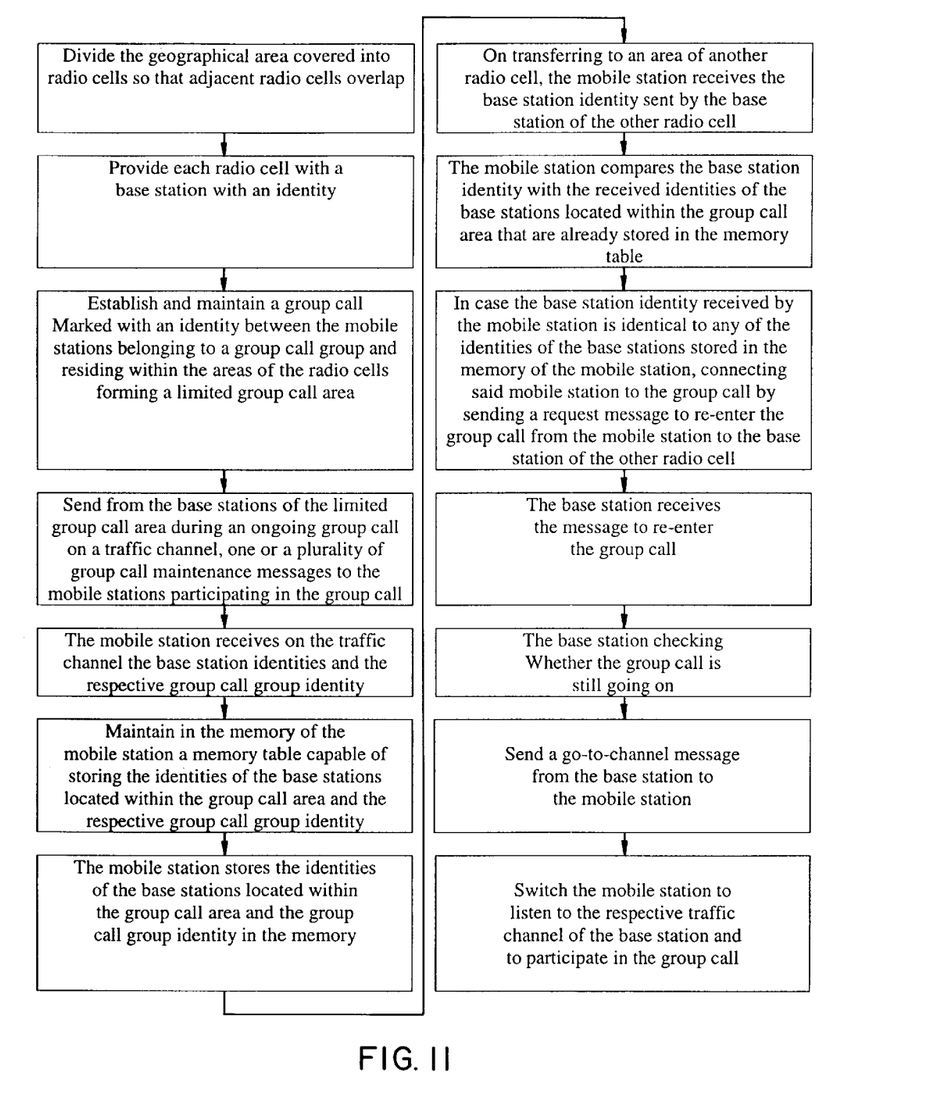
FIG. 11 is a block diagram illustrating a method according to the invention.
Figure 12:
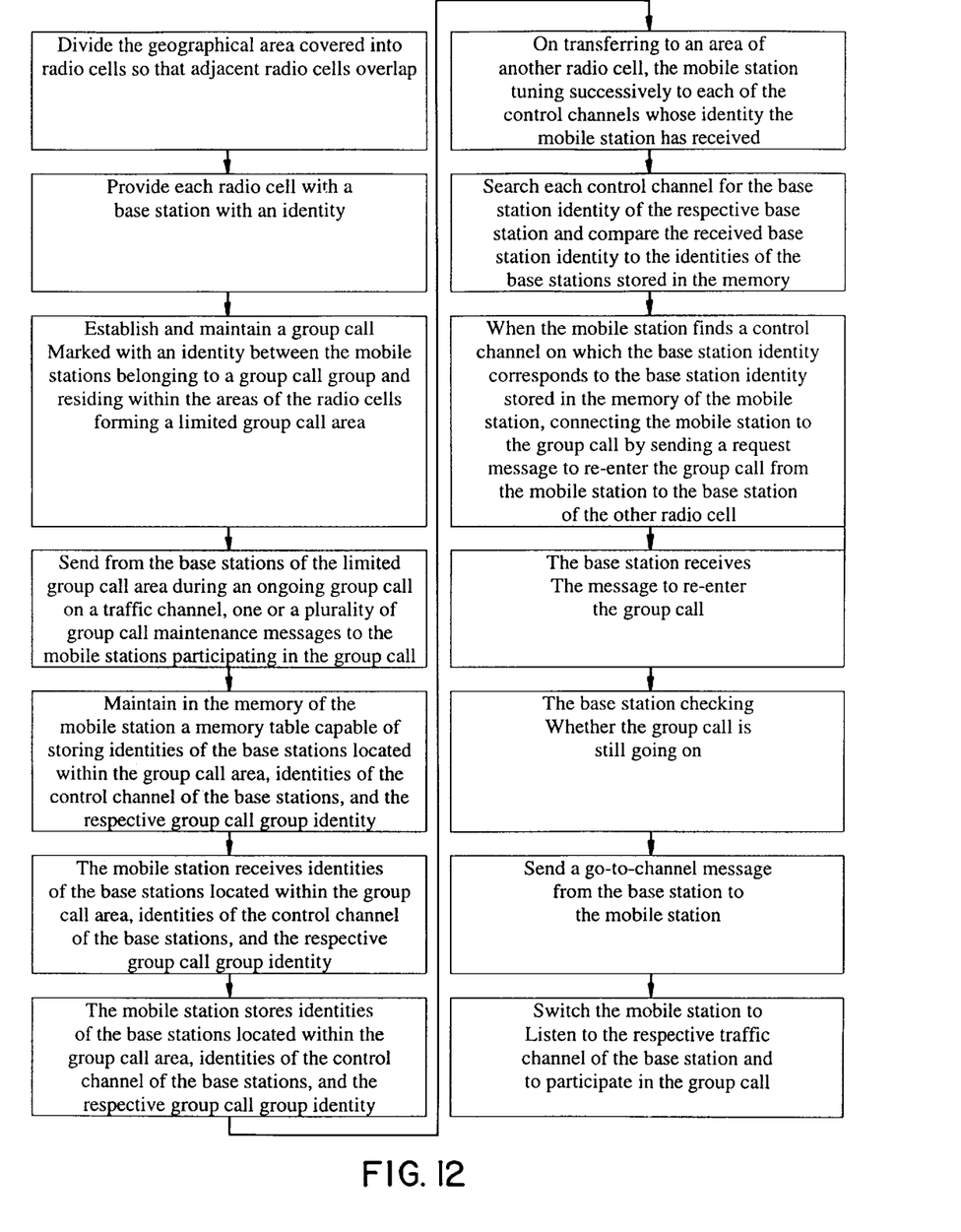
FIG. 12 is a block diagram illustrating a method according to the invention.
Figure 13:
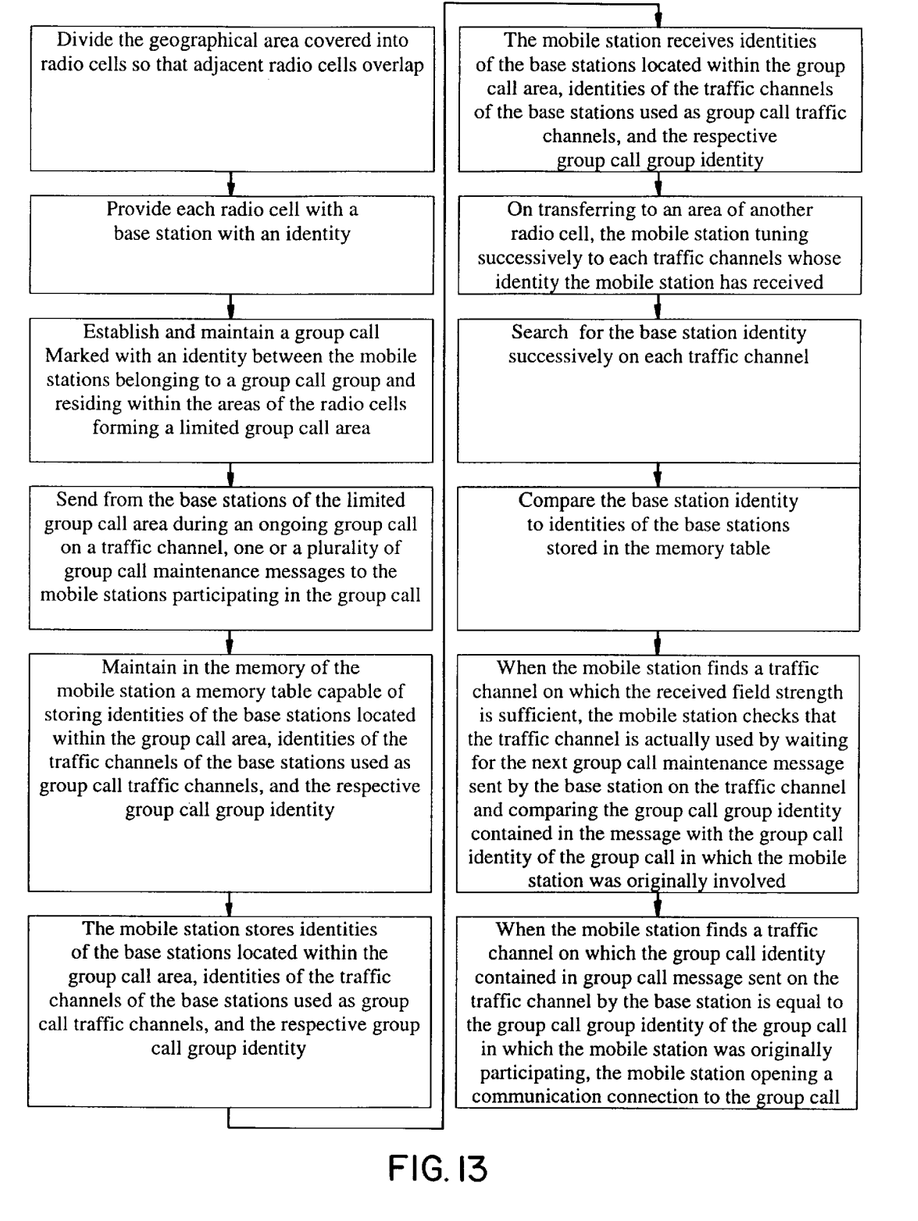
FIG. 13 is a block diagram illustrating a method according to the invention.

The table of FIG. 10 contains information of group calls in progress. The information is set forth as follows:

| GROUP ID | Group number. |
|---|---|
| BS# | Identity, such as a number, of a base station through which the call is connected. |
| TC# | For each base station the number of a traffic channel on which the call is established at the base station. |

The table should be able to accommodate as many base station identity—traffic channel identity (BS#–TC#) parameters as there are base stations that can participate in a group call at a time in the system, that is, at the most the total number of base stations included in the system.

In the following, the system controller TSC illustrated in the block diagram of FIG. 3 will be described with reference to FIG. 10 to make clear its significance for the invention.

The system controller TSC maintains a table shown in FIG. 10, e.g., in its memory (303, FIG. 3), concerning on-going group calls. If more base stations can be connected to an on-going group call or base stations are able to leave an on-going group call, the table should be updated accordingly. When the group call terminates, the information concerning this particular call has to be deleted from the table of FIG. 10.

The system controller TSC sends group call maintenance messages, i.e., GCSD messages, during a group call on the traffic channel TC# via each base station connected to the call, so that one group call maintenance message GCSD is sent for each BS#–TC# pair involved in each group call and listed in the table of FIG. 10. The control channel required for the message, that is, the CC# information is derived from the table of FIG. 9 at the identity BS# of the respective base station.

The group call maintenance messages, i.e., the GCSD messages, are broadcast on the traffic channel as often as allowed by the other functions.

In addition, when the system controller TSC receives an RTRC message containing a group identity, i.e., a group number GROUP ID, on the control channel of one of the base stations, it has to search the table of FIG. 10 for the data record corresponding to the group number. If the group number is found in the table, and that particular base station is contained in the data record, the group call is in progress at the base station. The system controller TSC thus responds to the RTRC message sent by the mobile station by sending a GTC message, which contains the identity or number of the group call group and the number TC# of the traffic channel used by the group call group at the particular base station. As a result, the mobile station re-enters the group call.

The invention has a further inventive feature, which will be described below.

The system controller TSC may also send the group call maintenance messages, i.e., GCSD messages, concerning a particular call on the control channels of base station which are not involved in the group call but the control channels of which are adjacent to those of base station involved in the group call, for example, the base station BS4 in FIG. 2. The mobile station may thus be implemented so that when it receives such a message and is involved in the particular group call group, it starts to effect the method 2 described for the mobile station above.

In this way, an improvement is achieved in that mobile stations that are in a rest state, belong to the group, and are, in principle, within the coverage area of the group call, are able to enter the call even though they have initially selected to listen to another base station also covering the area.

The drawings and the description referring to them are only intended to illustrate the idea of the invention. In their details, a group call method in a mobile radio system, a system controller and a mobile station in a mobile radio system according to the invention may vary within the scope of the claims. Even though the invention has been described above mainly with reference to trunking systems, it is equally applicable in other kind of mobile radio and cellular radio systems.

We claim:

1. A system controller in a mobile radio system, said controller comprising:

means for controlling operation of a plurality of base stations;

memory means for storing information concerning mobile stations;

interface means for providing telecommunication connections;

a switching matrix for switching speech paths;

controller means for call establishment and release, said controller means comprising:

means for sending on a traffic channel via each base station located within a group call area during a group call, to a mobile station participating in said group call, one or a plurality of group call maintenance messages containing at least identities of said base stations located within said group call area, identities of said traffic channels used as group call traffic channels at said base stations, and a group call group identity.

2. A method for maintaining a group call in a mobile radio system, said method comprising:

dividing a geographical area covered by said mobile radio system into radio cells so that adjacent cells overlap;

providing each radio cell with a base station provided with an identity;

each base station having at least one control channel and at least one traffic channel for being in radio communication with mobile radio stations located in said radio cell;

establishing and maintaining a group call marked with an identity between said mobile stations belonging to a group call group and residing within the areas of said radio cells forming a limited group call area;

sending from said base stations of said limited group call area during an ongoing group call on said traffic channel, one or a plurality of group call maintenance messages to said mobile stations participating in said group call;

said group call maintenance messages containing at least said identities of said base stations located within the areas of said radio cells forming said group call area, and said group call group identity;

said mobile station receiving on said traffic channel, said base station identities and said respective group call group identity;

maintaining in a memory of said mobile station, a memory table capable of storing said identities of said base stations located within said group call area and said respective group call group identity;

said mobile station storing said identities of said base stations located within said group call area and said group call group identity in said memory;

on transferring to an area of another radio cell, said mobile station receiving said base station identity sent by said base station of said other radio cell;

said mobile station comparing said base station identity with the received identities of said base stations located within said group call area that are already stored in said memory table;

in response to said comparing step, in case said base station identity received by said mobile station is identical to any of said identities of said base stations stored in said memory of said mobile station, connecting said mobile station to said group call by sending a request message to re-enter said group call from said mobile station to said base station of said other redio cill, said request message containing said group call group identity and said identity of said mobile station;

receiving said message to re-enter said group call by said base station;

in response to said request message to re-enter said group call, said base station checking whether said group call is still going on;

in case said group call is still ongoing, sending a go-to-channel message from said base station to said mobile satation; and in response to said go-to-channel message, switching said mobile station to listen to said respective traffic channel of said base station and to participate in said group call.

3. A method for maintaining a group call in a mobile radio system, said method comprising:

dividing a geographical area covered by said mobile radio system into radio cells so that adjacent cells overlap;

providing each radio cell with a base station provided with an identity;

each base station having at least one control channel and at least one traffic channel for being in radio communication with mobile radio stations located in said radio cell;

establishing and maintaining a group call marked with an identity between said mobile stations belonging to a group call group and residing within the areas of said radio cells forming a limited group call area;

sending from said base stations of said limited group call area during an ongoing group call on said traffic channel, one or a plurality of group call maintenance messages to said mobile stations participating in said group call;

said group call maintenance messages containing at least said identities of said base stations located within the areas of said radio cells forming said group call area, identities of said control channels of said base stations located within the areas of said radio cells, and said group call group identity;

maintaining in a memory of said mobile station, a memory table capable of storing said identities of said base stations located within said group call area, said identities of said control channels of said base stations, and said respective group call group identity;

said mobile station receiving said identities of said base stations located within said group call area, said identities of said control channels of said base stations, and said respective group call group identity;

said mobile station storing said identities of said base stations located within forming said group call area, said identities of said control channels of said base stations, and said respective group call group identity in said memory table;

on transferring to an area of another radio cell, said mobile station tuning successively to each one of said control channels whose identity said mobile station has received;

searching on each control channel for the base station identity of said respective base station and comparing said received base station identity to said identities of said base stations stored in said memory;

when said mobile station finds said control channel on which said base station identity sent by said base station to said base station identity stored in said memory of said mobile station, connecting said mobile station to said group call by sending a request message to re-enter said group call from said mobile station to said base station of said other radio cell, said request message containing said group call group identity and said identity of said mobile station;

receiving said request message to re-enter said group call message by said base station;

in response to said request message to re-enter said group call, said base station checking whether said group call is still going on;

in case said group call is still ongoing, sending a go-to-channel message from said base station to said mobile station; and in response to said go-to-channel message switching said mobile station to listen to said respective traffic channel of said base station and to participate in said group call.

4. A method for maintaining a group call in a mobile radio system, said method comprising:

dividing a geographical area covered by said mobile radio system into radio cells so that adjacent cells overlap;

providing each radio cell with a base station provided with an identity;

each base station having at least one control channel and at least one traffic channel for being in radio communication with mobile radio stations located in said radio cell;

establishing and maintaining a group call marked with an identity between said mobile stations belonging to a group call group and residing within the areas of said radio cells forming a limited group call area;

sending from said base stations of said limited group call area during an ongoing group call on said traffic channel, one or a plurality of group call maintenance messages to said mobile stations participating in said group call;

said group call maintenance message containing at least said identities of said base stations located within said group call area, said identities of said traffic channels used as group call traffic channels at said base stations, and said respective group call group identity;

maintaining in a memory of the mobile station, a memory table capable of storing said identities of said base stations located within said group call area, said identities of said traffic channels used as group call traffic channels at said base stations, and said respective group call group identity;

said mobile station receiving said identities of said base stations located within said group call area, said identities of said traffic channels of said base stations used as group call traffic channels, and said respective group call group identity;

said mobile station storing said identities of said base stations located within said group call area, said identities of said traffic channels of said base stations used as group call traffic channels, and said respective group call group identity in said memory;

on transferring to an area of another radio cell, said mobile station tuning successively to each one of said traffic channels whose identity said mobile station has received;

searching for the base station identity of said respective base station, successively on each traffic channel;

comparing said received base station identity to said identities of said base stations stored in said memory;

when said mobile station finds a traffic channel on which the received field strength is sufficient, said mobile station checking that said traffic channel is actually used by said group call by waiting for the next group call maintenance message sent by said base station on said traffic channel and comparing said group call group identity contained in said message with the group call identity of the group call in which said mobile station was originally involved; and when said mobile station finds a traffic channel on which said group call identity contained in said group call maintenance message sent on said traffic channel by said base station is equal to said group call group identity of said group call in which said mobile station was originally participating, said mobile station opening a communication connection to said group call.

5. A mobile station in a mobile radio system, said mobile station comprising:

a transceiver for maintaining a group call on a traffic channel;

receiving means for receiving on the traffic channel of a first base station, one or a plurality of group call maintenance messages containing information concerning base stations located within the area of radio cells forming a group call area, and a group call group identity;

a memory arranged to store the identities of base stations maintaining the same group call, said identities being contained in said group call maintenance messages;

measuring means for measuring the signal strength of signals received from said first base station and from other base stations of said mobile radio system; and a controller for controlling operation of said mobile station, said controller being arranged to select a base station, whose identity is stored in said memory, when said measuring means indicates that the field strength of signals received from said selected base station is higher than the field strength of signals received from said first base station.

6. A mobile station in a mobile radio system, said mobile station comprising:

a transceiver for maintaining a group call on a traffic channel;

receiving means for receiving on the traffic channel of a first base station one or a plurality of group call maintenance messages containing information concerning base stations located within the area of radio cells forming a group call area, and a group call group identity;

a memory arranged to store identities of base stations maintaining the same group call and control channel identities of base stations maintaining the same group call, said identities and said control channel identities being contained in said group call maintenance messages received on said traffic channel;

measuring means for measuring the signal strength of signals received from said first base station and from other base stations of said mobile radio system; and a controller for controlling operation of said mobile station, said controller being arranged to select a base station, whose identity is stored in said memory, when said measuring means indicates that the field strength of signals received from said selected base station is higher than the field strength of signals received from said first base station.

7. A mobile station in a mobile radio system, said mobile station comprising:

a transceiver for maintaining a group call on a traffic channel;

receiving means for receiving on the traffic channel of a first base station, one or a plurality of group call maintenance messages containing information concerning base stations located within the area of radio cells forming a group call area, and a group call group identity;

a memory arranged to store identities of base stations maintaining the same group call and identities of traffic channels used by the same call at base stations maintaining the same group call, said identities and said traffic channel identities being contained in said group call maintenance messages received on said traffic channel;

measuring means for measuring the signal strength of signals received from said first base station and from other base stations of said mobile radio system; and a controller for controlling operation of said mobile station, said controller being arranged to select a base station, whose identity is stored in said memory, when said measuring means indicates that the field strength of signals received from said selected base station is higher than the field strength of signals received from said first base station.

8. A mobile station in a mobile radio system, said mobile station comprising:

a transceiver for maintaining a group call on a traffic channel;

receiving means for receiving on the traffic channel of a first base station, one or a plurality of group call maintenance messages containing information concerning base stations located within the area of radio cells forming a group call area, and a group call group identity;

a memory arranged to store identities of base stations maintaining the same group call, control channel identities of base stations maintaining the same group call, and identities of traffic channels used by the same call at base stations maintaining the same group call, said identities, said control channel identities, and said traffic channel identities being contained in said group call maintenance messages received on said traffic channel;

measuring means for measuring the signal strength of signals received form said first base station and from other base stations of said mobile radio system; and a controller for controlling operation of said mobile station, said controller being arranged to select a base station, whose identity is stored in said memory, when said measuring means indicates that the field strength of signals received from said selected base station is higher than the field strength of signals received from said first base station.

* * * * *

UNITED STATES PATENT AND TRADEMARK OFFICE
CERTIFICATE OF CORRECTION

PATENT NO. : 5,970,417
DATED : October 19, 1999
INVENTOR(S) : TOYRYLA et al.

It is certified that error appears in the above-identified patent and that said Letters Patent is hereby corrected as shown below:

On the title page,

Under "[30] Foreign Application Priority Data"

Please add:

-- Dec. 15, 1993 . . . . . . . . . . . . . . . PCT/FI93/00542 --

Signed and Sealed this

Twenty-eighth Day of November, 2000

Attest:

Q. TODD DICKINSON

*Attesting Officer*  *Director of Patents and Trademarks*